(12) United States Patent
Wu (10) Patent No.: US 8,256,972 B2
(45) Date of Patent: Sep. 4, 2012

(54) FIBER OPTIC CONNECTOR AND FIBER OPTIC ASSEMBLY HAVING SAME

(75) Inventor: Kun-Chan Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 284 days.

(21) Appl. No.: 12/780,954

(22) Filed: May 17, 2010

(65) Prior Publication Data

US 2011/0188811 A1  Aug. 4, 2011

(30) Foreign Application Priority Data

Feb. 3, 2010  (TW) ................................ 99103125 A (51) Int. Cl.
  *G02B 6/32* (2006.01)
  *G02B 6/36* (2006.01)
(52) U.S. Cl. ................................ 385/93; 385/33; 385/79
(58) Field of Classification Search .................... 385/33, 385/79, 93
  See application file for complete search history.

(56) References Cited

U.S. PATENT DOCUMENTS 6,459,835 B1 * 10/2002 Nagaoka et al. ................ 385/43

* cited by examiner

*Primary Examiner* — Jerry Rahll
(74) *Attorney, Agent, or Firm* — Altis Law Group, Inc.

(57) ABSTRACT

An exemplary fiber optic connector includes four converging lenses and a main body. The four converging lenses each includes a base portion and two engaging portions protruding from the base portion. The main body includes a first surface and a second surface at two opposite sides thereof. The first surface has four first receiving holes defined therein for receiving four respective optical fibers. The second surface has four second receiving holes aligning with the four respective first receiving holes defined therein. In addition, the main body defines an inner surface in each second receiving hole and two first slots in the inner surface. Each second receiving hole is configured for fixedly receiving the base portion of corresponding converging lens with the two engaging portions engaging in the two first slots.

20 Claims, 6 Drawing Sheets

FIBER OPTIC CONNECTOR AND FIBER OPTIC ASSEMBLY HAVING SAME

BACKGROUND

1. Technical Field

The disclosure generally relates to fiber optic connectors, and particularly relates to a fiber optic connector for connecting to another fiber optic connector to cooperatively couple optical signals between optical fibers.

2. Description of Related Art

Figure 6:
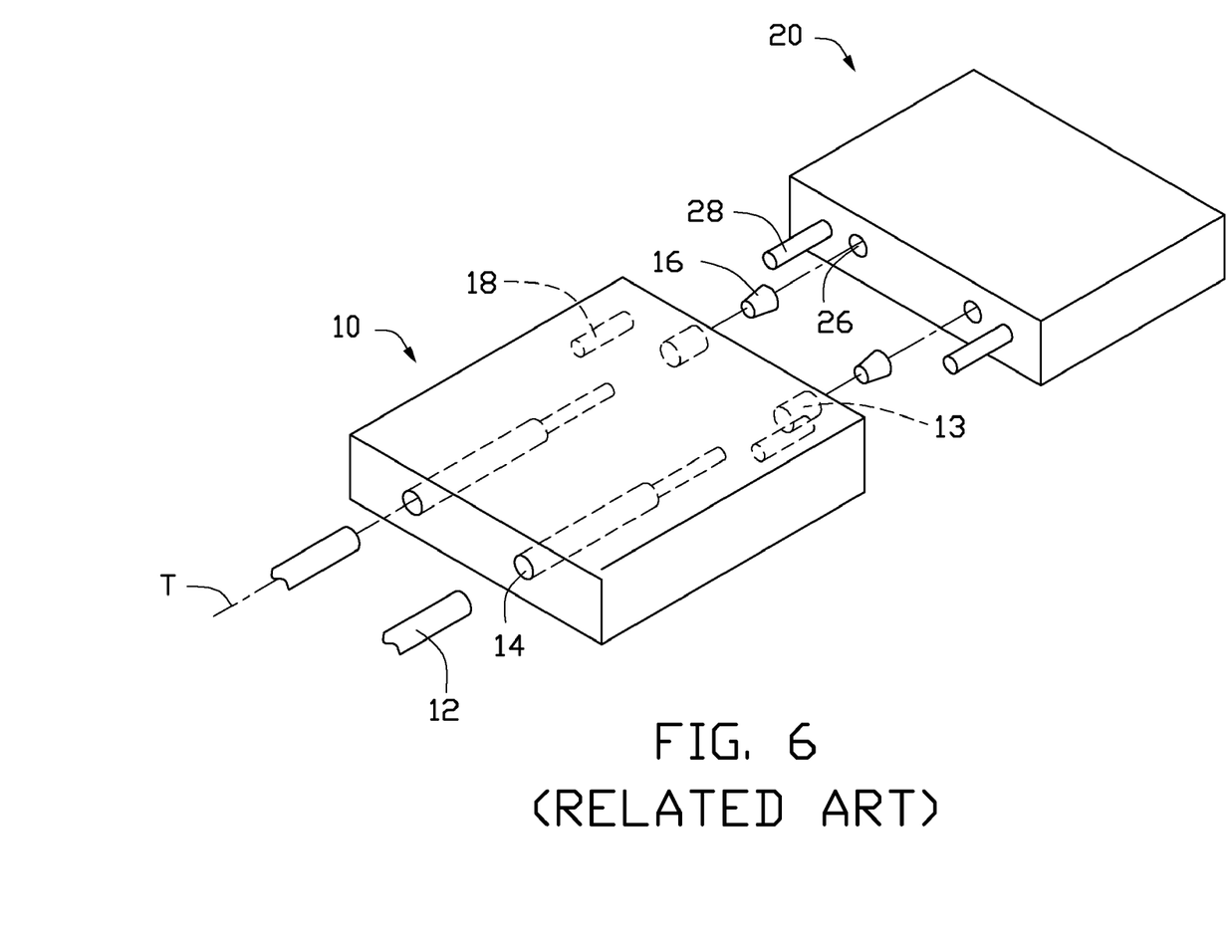
FIG. 6 is a schematic view of a typical fiber optic connector in use with optical fibers and a USB.

A fiber optic connector 10 of a related art is used to couple a number of optical fibers 12. As shown in FIG. 6, the connector 10 includes two opposite ends. One end of the connector 10 is connected to the fibers 12, and the other end of the connector 10 is connected to a number of first converging lenses 16. The connector 10 defines a number of first receiving holes 13, a number of second receiving holes 14, and a number of fixing holes 18 therein. The first receiving holes 13 receive the respective first converging lenses 16. The second receiving holes 14 receive the respective fibers 12. The first converging lenses 16 align with the respective fibers 12. In operation of the connector 10, an electronic device, such as a universal serial bus (USB) 20 used in a computer is provided, and the connector 10 is connected to the USB 20. The USB 20 may for example include a number of second converging lenses 26, and a number of fixing protrusions 28. The fixing protrusions 28 are inserted into the respective fixing holes 18. With this configuration, each of the fibers 12 coaxially aligns with a corresponding first converging lens 16, and a corresponding second converging lens 26 along an axis T. Thereby, optical signals can be transmitted from the fibers 12 to the USB 20 through the first converging lenses 16 and the second converging lenses 26.

However, the first receiving holes 13 may not fittingly receive the respective first converging lenses 16. In such case, the first converging lenses 16 may be bendable relative to the axis T. Because of this, precise alignment of the first and the second converging lenses 16 and 26 is difficult to obtain during production and assembly, resulting in inferior quality products.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

Moreover, in the drawings, like reference numerals designate corresponding parts throughout the several views.

DETAILED DESCRIPTION

Embodiments will now be described in detail below, with reference to the drawings.

Figure 1:
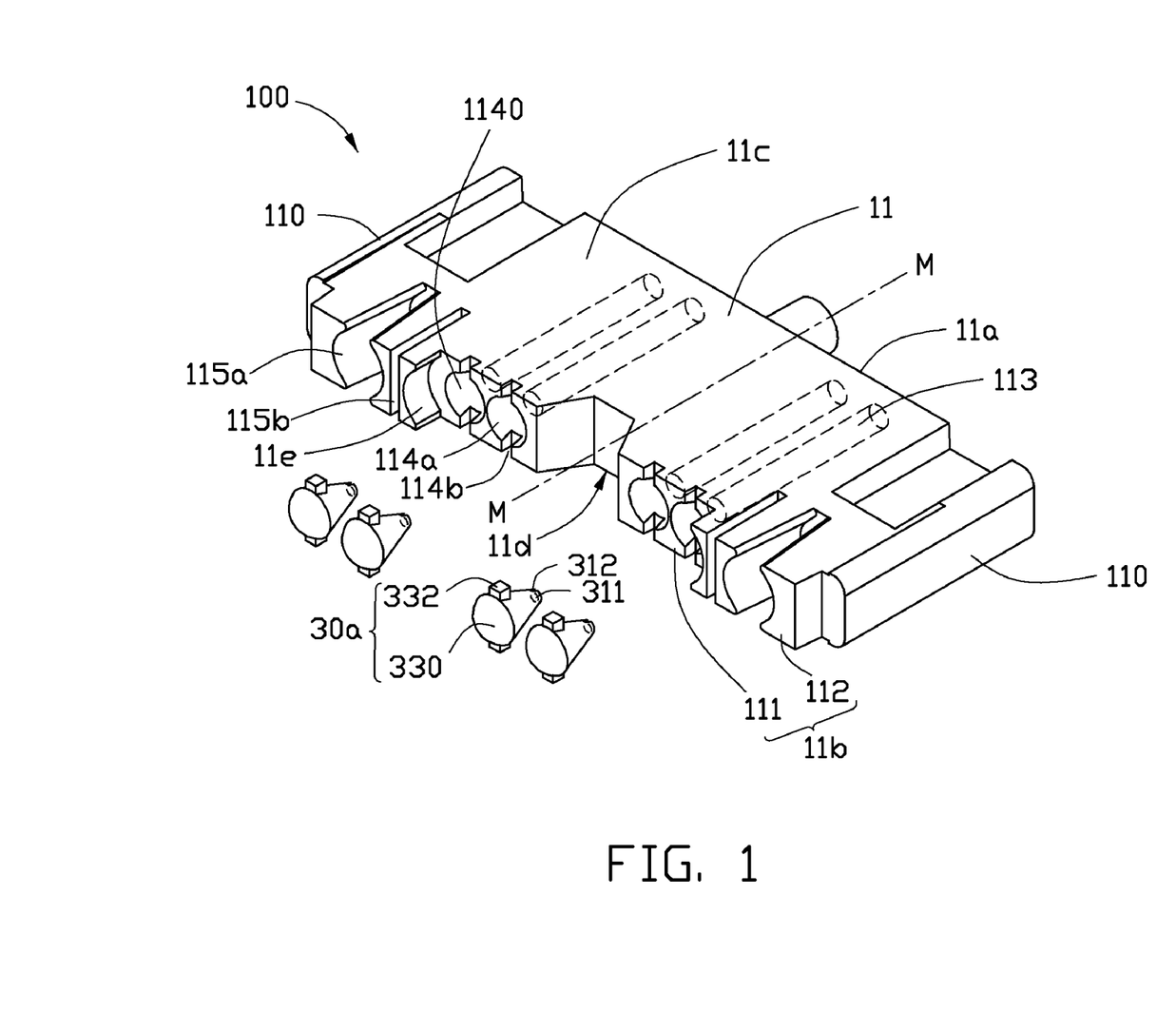
FIG. 1 is a schematic, exploded view of a fiber optic connector in accordance with a first embodiment, the fiber optic connector including a number of converging lenses.

Referring to FIG. 1, a fiber optic connector 100 in accordance with a first embodiment, includes a main body 11 and at least one first converging lens 30a.

The main body 11 defines a central axis M, and includes two body portions 110 at two opposite sides of the central axis M. The two body portions 110 are symmetrically opposite to each other across the central axis M. In addition, the main body 11 includes a first surface 11a, a second surface 11b, a third surface 11c, and a fourth surface 11d. The first and the second surfaces 11a and 11b are located at two opposite sides of main body 11. Each of the third and the fourth surfaces 11c and 11d is located between and adjoin the first and the second surfaces 11a and 11b. The third and the fourth surfaces 11c and 11d are substantially parallel with one another.

The first surface 11a is substantially perpendicular to the central axis M, and has at least one first receiving hole 113 defined therein. In this embodiment, the at least one first receiving hole 113 includes four first receiving holes 113. Each receiving hole 113 is a blind hole. The four first receiving holes 113 are substantially parallel with the central axis M respectively. Two first receiving holes 113 are defined at one body portion 110, and the other two first receiving holes 113 are defined at the other body portion 110. In particular, the four first receiving holes 113 are symmetrically opposite to each other across the central axis M.

The second surface 11b includes two first surface portions 111 and two second surface portions 112. The two first surface portions 111 are coaxial with one another and spaced from one another at two opposite sides of the central axis M. The two second surface portions 112 are coaxial with one another and spaced from one another at two opposite sides of the central axis M. The two first surface portions 111 are near to the central axis M, while the two second surface portions 112 are farther away from the central axis M. In particular, each of the first and the second surface portions 111, 112 are substantially parallel with the first surface 11a. The two second surface portions 112 are located at a side of the first surface portions 111 facing away from the first surface 11a, thereby two steps 11e are formed between the first and the second surface portions 111 and 112. In alternative embodiments, the second surface 11b can be a flat surface substantially parallel with the first surface 11a.

The fiber optic connector 100 has four second receiving holes 114a defined in the first surface portion 111. The four second receiving holes 114a communicate and align with the four respective first receiving holes 113. The second receiving hole 114a can be cylindrical shaped. In this embodiment, the second receiving hole 114a is frusto-conical shaped, and each second receiving hole 114a tapers in a direction from the first surface portion 111 to the corresponding first receiving hole 113. In addition, each second receiving hole 114a has an inner surface 1140 defined therein. The inner surface 1140 has two first slots 114b defined therein. The two first slots 114b are located at two opposite sides of the second receiving hole 114a. In particular, each of the two first slots 114b communicates with the second receiving hole 114a, and is exposed at the respective third and fourth surface 11c and 11d respectively.

Figure 2:
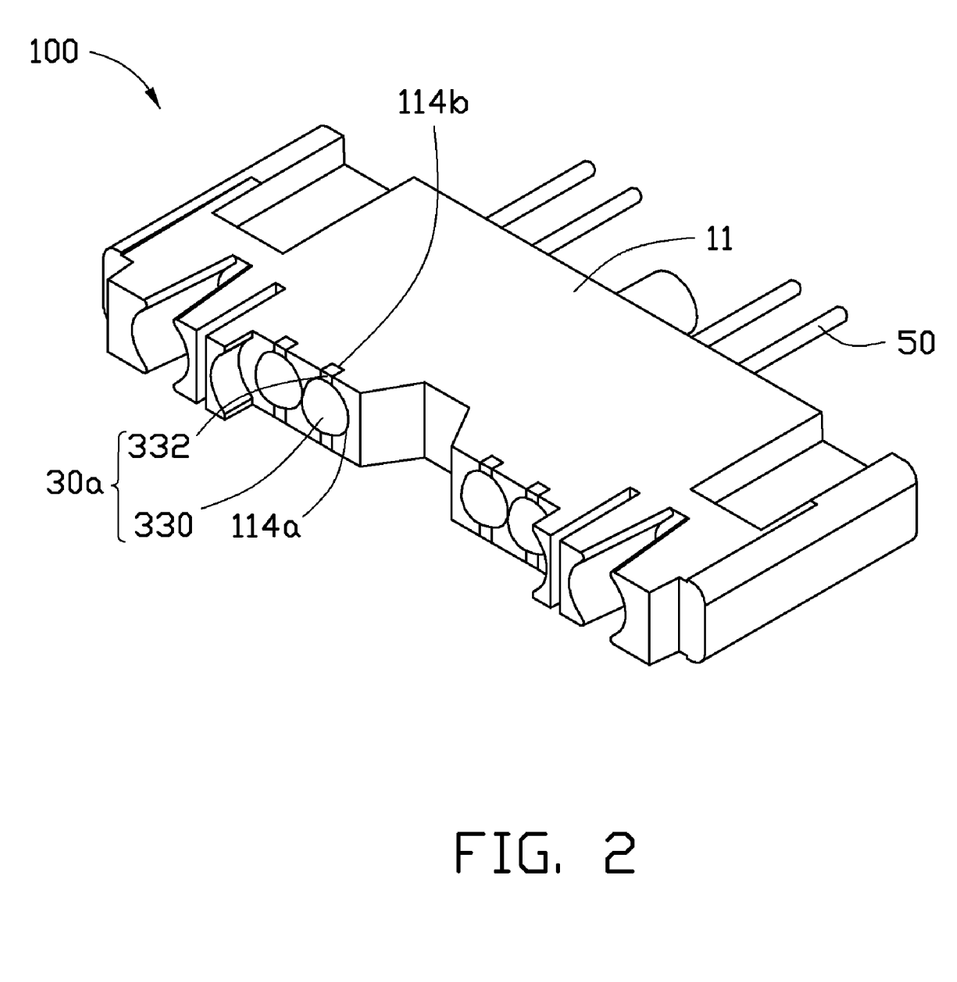
FIG. 2 is a schematic, assembled view of the fiber optic connector of FIG. 1 with optical fibers attached thereto.
Figure 3:
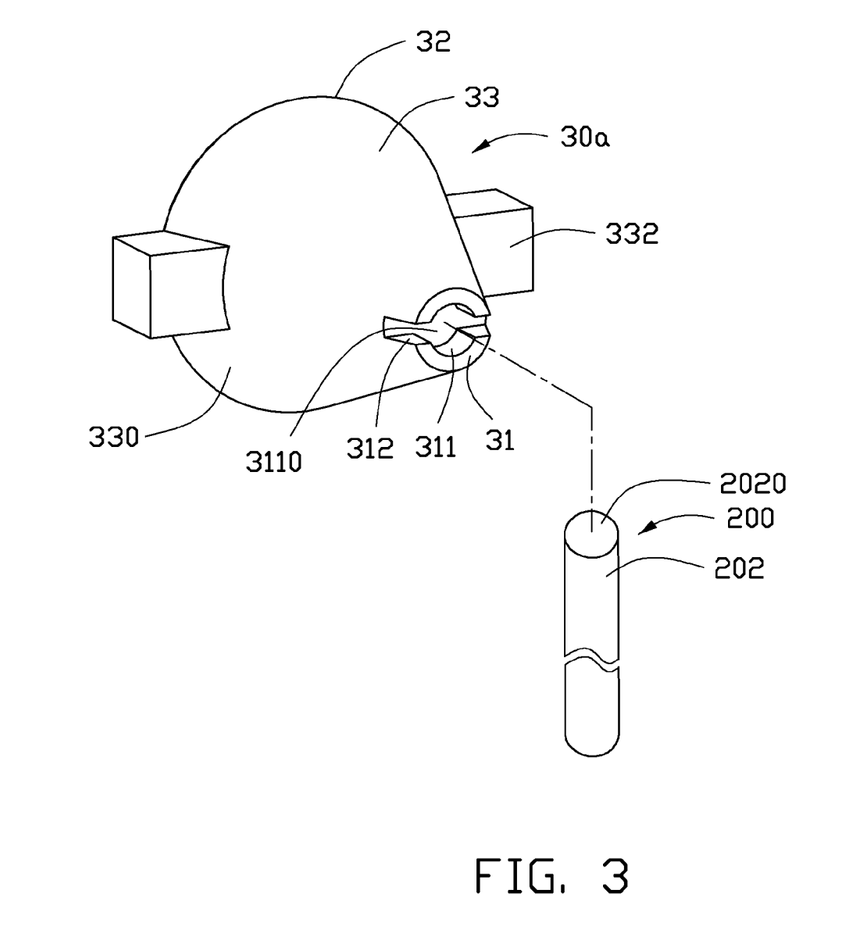
FIG. 3 is a schematic, exploded view of a single converging lens and a single optical fiber from the fiber optic connector of FIG. 2.

Referring also to FIGS. 2 and 3, the number of the at least one first converging lens 30a is equal to that of the second receiving holes 114a. That is, the at least one first converging lens 30an includes four first converging lenses 30a. Each first converging lens 30a has substantially a same shape as the corresponding second receiving holes 114a. Thus, the four converging lens 30a can be fittingly received in the four respective second receiving holes 114a, as shown in FIG. 2. Each converging lens 30an includes a base portion 330 and two engaging portions 332 protruding from the base portion 330. The base portion 330 includes a bottom surface 31 and a top surface 32 at two opposite sides thereof, and a peripheral side surface 33 (see FIG. 3). The peripheral side surface 33 is located between and adjoins the bottom surface 31 and the top surface 32. In this embodiment, each first converging lens 30a has a frusto-conical shape, and the first converging lenses 30a tapers from the top surface 32 to the bottom surface 31.

The shape of the two engaging portions 332 is substantially the same as the two first slots 114b defined at the second receiving hole 114a. In assembling the first converging lens 30a to the main body 11, each base portion 330 of the first converging lens 30a is inserted into the corresponding second receiving hole 114a until the engaging portions 332 are fittingly engaged in the two first slots 114b (see FIG. 2). In particular, the base portion 330 may be attached to the main body 11 with an adhesive (not shown), such as glue. The adhesive can be coated on either or both an interior surface (not labeled) defined in the first slots 114b, and an exterior surface (not labeled) of the engaging portions 332.

The four first receiving holes 113 are configured to fixedly receive four conventional optical fibers 50 respectively (see FIGS. 1 and 2). Each of the first receiving holes 113 can be substantially rectangular or substantially round. Provided the optical fibers 50 can be fittingly received in the first receiving holes 113, the shape of the first receiving holes can be varied and remain within the scope of the disclosure. In this embodiment, the first receiving holes 113 each are round.

The optical fibers 50 can be attached to the respective first converging lenses 30a by applying an adhesive (not shown). In one typical example, the first converging lens 30a has a recess 311 defined in the bottom surface 31 to fittingly receive a distal end 202 of the optical fiber 200 (see FIG. 3). The first converging lens 30a has a surface 3110 defined in the recess 311 and facing away from the bottom surface 31. The adhesive can be coated on either or both of the surface 3110 and an end surface 2020 of the distal end 202. In operation, the surface 3110 serves as a light incident surface for receiving optical signals, generally in the form of light, from the optical fiber 50. The light passes through the first converging lens 30a to output from the top surface 32 thereof. In this embodiment, the peripheral side surface 33 may have a reflective layer (not shown) formed thereon. The reflective layer may converge light to output the top surface 32. In this manner, the optical signals can be transmitted through the first converging lenses 30a efficiently. In addition, the peripheral side surface 33 may further have a second slot 312 defined in the peripheral surface 33. The second slot 312 communicates with the recess 311, and is exposed at the bottom surface 31. The second slot 312 is used to allow the adhesive to flow therethrough to the peripheral surface 33, if redundant adhesive is applied in the recess 311. In one aspect, the redundant adhesive can be used to be applied between an inner surface (not labeled) in the second receiving holes 114a and the peripheral surface 33 of the first converging lens 30a, thus attachment of the first converging lenses 30a and the main body 11 is enhanced.

The main body 11 may further define at least one receiving slot 115a, and at least one buffer slot 115b in the second surface 11b (see back to FIG. 1). In this embodiment, the at least one receiving slot 115an includes two receiving slots 115a. The at least one buffer slot 115b includes two buffer slots 115b. The two receiving slots 115a and the two buffer slots 115b are defined in the two second surface portions 112 respectively. In particular, each second surface portion 112 has a receiving slot 115a and a buffer slot 115b defined therein. Each of the receiving slots 115a may be cylindrical shaped. In this embodiment, the receiving slot 115a has a frusto-conical shape, and the receiving slot 115a tapers in a direction from the second surface 11b to the first surface 11a. In this embodiment, the receiving slot 115a is exposed at both the third surface 11c and the fourth surface 11d.

The two receiving slots 115a are symmetrically opposite to each other across the central axis M. The two buffer slots 115b are also symmetrically opposite to each other across the central axis M. Each of the buffer slots 115b is located between the receiving slot 115a and the first converging lens 30a at a same side of the central axis M. The buffer slots 115b is exposed at both the third surface 11c and the fourth surface 11d.

One advantage of the connector 100 is that the main body 11 is equipped with the first converging lenses 30a each with a base portion 330 and two engaging portions 332. During assembly, the base portion 330 can be fittingly received in the second receiving hole 114a with the two engaging portions 332 engaging in the two respective first slots 114b. Engagement of the engaging portions 332 and the first slots 114b ensure that the first converging lenses 30a are securely connected to the main body 11. In addition, precise alignment of the first converging lenses 30a and the optical fibers 50 is ensured.

The number of the first receiving holes 113, the second receiving holes 114a, the first slots 114b, the first converging lenses 30a, the engaging portions 332, the receiving slots 115a, and the buffer slots 115b is not limited to the above illustrated embodiment. In alternative embodiments, the connector 100 including only one first receiving hole 113, one second receiving hole 114a, one first slot 114b, one first converging lens 16, one engaging portion 332, one receiving slot 115a, and one buffer slot 115b should also be considered to be within the scope of the disclosure.

Figure 4:
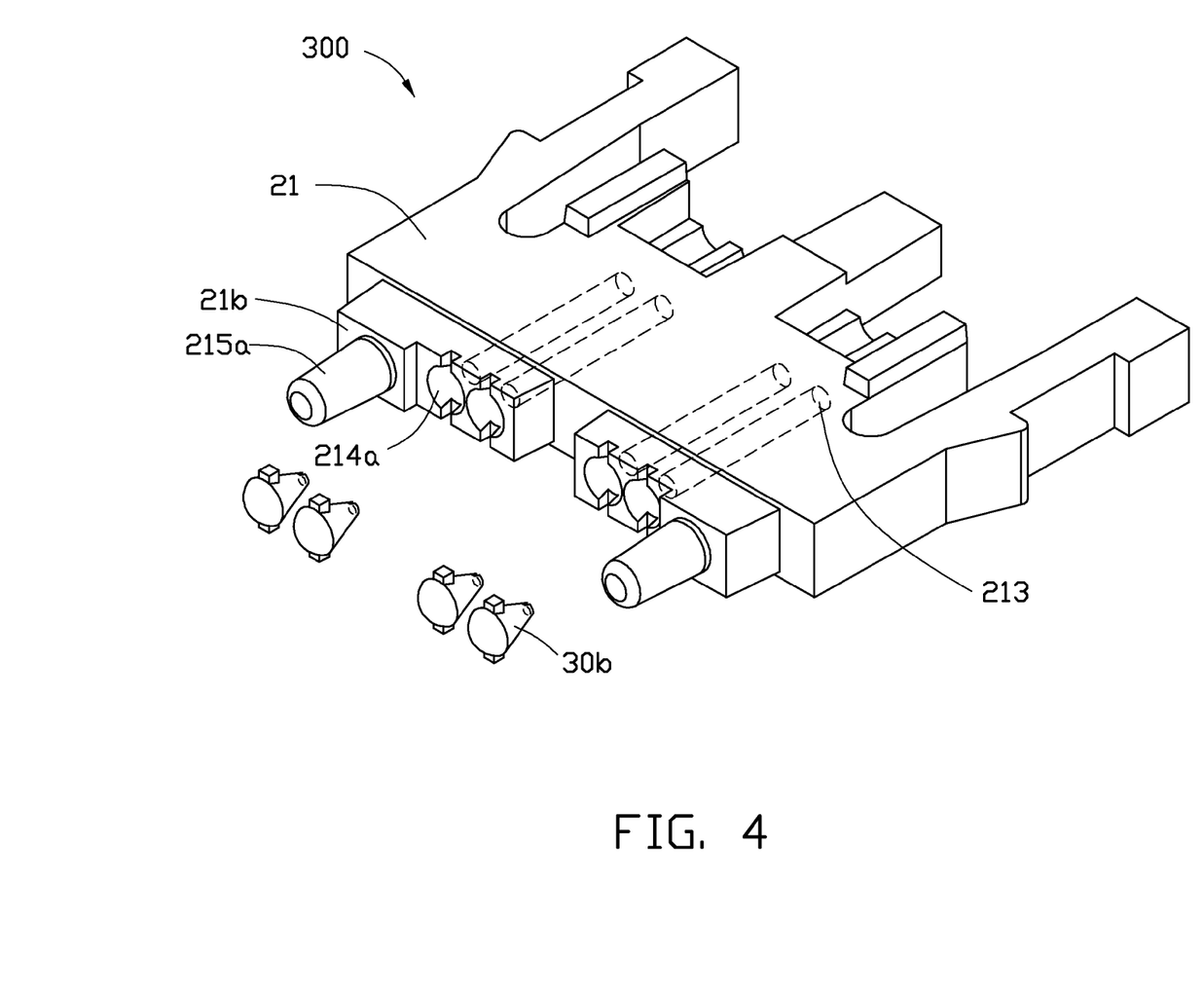
FIG. 4 is a schematic, exploded view of a fiber optic connector in accordance with a second embodiment.

Referring to FIG. 4, a fiber optic connector 300 in accordance with a second embodiment is shown. The fiber optic connector 300 is similar to the fiber optic connector 100 of the first embodiment in structure and principle, and includes a main body 21 and four second converging lens 30b. The main body 21 defines four first receiving holes 213 for receiving optical fibers (not shown), and four second receiving holes 214a for fittingly receiving the respective second converging lenses 30b. The second converging lens 30b is similar to the first converging lens 30an in the first embodiment. However, instead of having two receiving slots and two buffer slots, the connector 300 includes two fixing protrusions 215a protruding from a second surface 21b of the main body 21.

Figure 5:
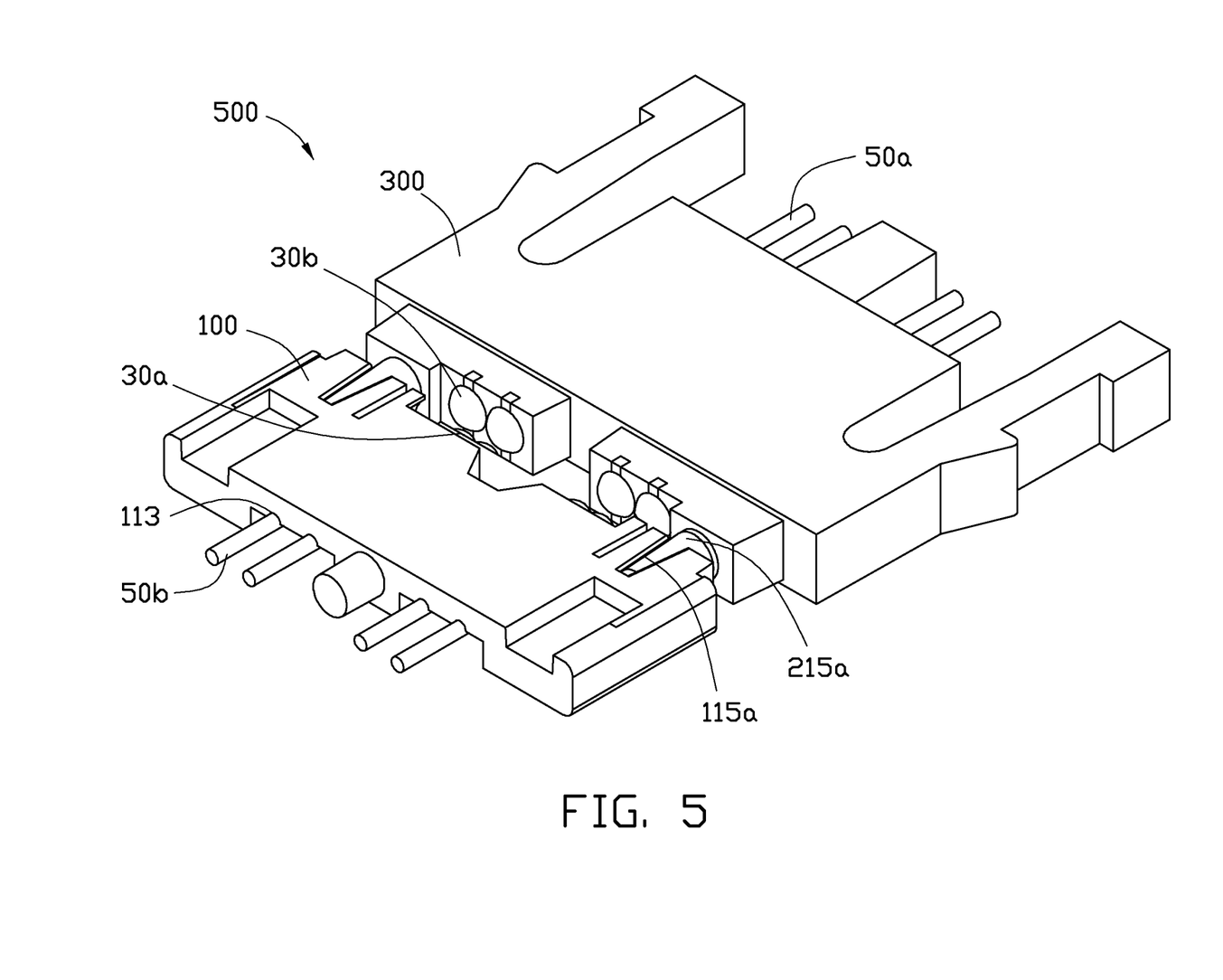
FIG. 5 is a schematic view of a fiber optic assembly with optical fibers attached thereto, the fiber optic assembly including the fiber optic connector of FIG. 1 and the fiber optic connector of FIG. 4.

Referring to FIG. 5, a fiber optic assembly 500 using the connector 100 of FIG. 1, and the connector 300 of FIG. 4 is shown. The fiber optic assembly 100 further includes four first optical fibers 50, and four second optical fibers 52. The connector 300 is connected to the connector 100 by inserting the fixing protrusions 215an into the respective fixing slots 115a of the connector 100. A dimension (for example, a diameter) of each protrusion 215a is relatively greater than that of any fixing slot 115a. Thus, the protrusions 215a can be interferentially received in the respective fixing slots 115a. The first optical fibers 50 are used to be fittingly received in the respective first receiving holes (not visible in FIG. 5) of the connector 300. The second optical fibers 52 are used to be fittingly received in the respective first receiving holes 113 of the connector 100.

In this embodiment, the protrusions 215a of the connector 300 precisely align with the fixing slot 115a of the connector 100. The four first optical fibers 50 precisely align with the respective second converging lenses 30b. The four second optical fibers 52 precisely align with the respective first converging lenses 30a. With this configuration, each of the first optical fibers 50 coaxially aligns with a corresponding second converging lens 30b, a corresponding first converging lens 30a, and a corresponding second optical fiber 52. Thus, optical signals can be transmitted from the first optical fibers 50 to the second optical fibers 52 through the first converging lenses 30a and the second converging lenses 30b efficiently.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A fiber optic connector, comprising:
   at least one converging lens comprising a base portion and at least one engaging portion protruding from the base portion; and
   a main body comprising a first surface and a second surface at two opposite sides thereof, at least one first receiving hole defined in the first surface for receiving at least one optical fiber, at least one second receiving hole defined in the second surface and aligning with the at least one first receiving hole, and the main body including at least one inner surface in the at least one second receiving hole and at least one first slot in the at least one inner surface, the at least one second receiving hole for fixedly receiving the at least one base portion of the at least one converging lens with the at least one engaging portion engaging in the at least one first slot, the main body further comprising a third surface and a fourth surface opposite to the third surface, each of the third surface and the fourth surface located between and adjoining the first surface and the second surface, the at least one first slot of each second receiving hole having two first slots defined in the inner surface at opposite sides thereof, the two first slots exposed at the respective third surface and fourth surface, and the at least one engaging portion of each converging lens comprising two engaging portions engaging the two respective first slots.

2. The fiber optic connector of claim 1, wherein the at least one second receiving hole comprises a plurality of second receiving holes, at least one converging lens comprises a plurality of converging lenses fixedly received in the respective second receiving holes.

3. The fiber optic connector of claim 2, wherein the two first slots are exposed at the second surface.

4. The fiber optic connector of claim 3, further comprising an adhesive, the two engaging portions being attached to the base body with the adhesive.

5. The fiber optic connector of claim 2, wherein the at least one first receiving hole comprises a plurality of first receiving holes for correspondingly receiving a plurality of optical fibers, the first receiving holes communicate with the respective second receiving holes, and the converging lenses are attached to the respective optical fibers.

6. The fiber optic connector of claim 5, further comprising an adhesive, each converging lens being attached to the corresponding optical fiber with the adhesive.

7. The fiber optic connector of claim 6, wherein the base portion of each converging lens has a frusto-conical shape, and the converging lens comprises a top surface adjacent to the second surface, a bottom surface facing away from the second surface, and a peripheral side surface located between and adjoins the top surface and the bottom surface, and the base portion tapers from the top surface to the bottom surface.

8. The fiber optic connector of claim 7, wherein the base portion has a recess defined in the bottom surface, and the adhesive is applied in the recess.

9. The fiber optic connector of claim 8, wherein the base portion has at least one second slot defined in the peripheral side surface, and the at least one second slot communicates with the recess.

10. The fiber optic connector of claim 9, wherein the at least one second slot is exposed at the bottom surface.

11. The fiber optic connector of claim 1, wherein the main body defines a central axis, and the main body comprise two body portions at two opposite sides of the central axis, the at least one second receiving hole comprises four second receiving holes, the two body portions each defines two second receiving holes, and the four second receiving holes are symmetrically opposite to each other across the central axis.

12. A fiber optic assembly comprising:
   a first fiber optic connector comprising:
      at least one first converging lens comprising a base portion and at least one engaging portion protruding from the base portion; and
      a main body comprising a first surface and a second surface at two opposite sides thereof, at least one first receiving hole defined in the first surface for receiving at least one first optical fiber, at least one second receiving hole defined in the second surface and aligning with the at least one first receiving hole, and the main body including at least one inner surface in the at least one second receiving hole and at least one first slot in the at least one inner surface, the at least one second receiving hole configured for fixedly receiving the at least one base portion of the at least one first converging lens with the at least one engaging portion engaging in the at least one first slot;
   a second fiber optic connector comprising a second main body and at least one second converging lens, the second main body comprising two opposite ends, one end of the second main body being optically coupled to at least one second optical fiber, and at least one second converging lens being fixedly connected to the other opposite end of the main body, and one of the first main body and the second main body comprising at least one fixing protrusion and the other of the first main body and the second main having at least one receiving slot for fixedly receiving the at least one fixing protrusion.

13. The fiber optic assembly of claim 12, wherein the main body further comprises a third surface and a fourth surface opposite to the third surface, each of the third surface and the fourth surface is located between and adjoins the first surface and the second surface, the at least one second receiving hole comprises a plurality of second receiving holes, at least one converging lens comprises a plurality of first converging lenses fixedly received in the respective second receiving holes, the at least one first slot of each second receiving hole has two first slots defined in the inner surface at two opposite sides thereof, the two first slots exposed at the respective third surface and fourth surface, and the at least one engaging portion of each first converging lens comprises two engaging portions engaging the two respective first slots.

14. The fiber optic assembly of claim 13, wherein the two first slots are exposed at the second surface.

15. The fiber optic assembly of claim 14, further comprising an adhesive, the two engaging portions being attached to the base body with the adhesive.

16. The fiber optic assembly of claim 13, wherein the at least one first receiving hole comprises a plurality of first receiving holes for correspondingly receiving a plurality of first optical fibers, the first receiving holes communicate with the respective second receiving holes, and the first converging lenses are attached to the respective first optical fibers.

17. The fiber optic assembly of claim 16, further comprising an adhesive, each first converging lens being attached to the corresponding first optical fiber with the adhesive.

18. The fiber optic assembly of claim 17, wherein the base portion of each first converging lens has a frusto-conical shape, and the first converging lens comprises a top surface adjacent to the second surface, a bottom surface facing away from the second surface, and a peripheral side surface located between and adjoins the top surface and the bottom surface, and the base portion tapers from the top surface to the bottom surface.

19. The fiber optic assembly of claim 18, wherein the base portion has a recess defined in the bottom surface, and the adhesive is applied in the recess.

20. The fiber optic assembly of claim 19, wherein the base portion has at least one second slot defined in the peripheral side surface, and the at least one second slot communicates with the recess.

* * * * *